United States Patent [19]

Etzbach et al.

[11] Patent Number: 4,702,945
[45] Date of Patent: Oct. 27, 1987

[54] OPTICAL RECORDING MEDIUM

[75] Inventors: Karl-Heinz Etzbach, Frankenthal; Peter Neumann, Wiesloch; Matthias Dust, Mannheim; Helmut Ringsdorf, Mainz-Gonsenheim; Hans-Werner Schmidt, Mainz; Guenter Baur; Friedrich Windscheid, both of Freiburg; Rudolf Kiefer, Voerstetten, all of Fed. Rep. of Germany

[73] Assignee: BASF Aktiengesellschaft, Ludwigshafen, Fed. Rep. of Germany

[21] Appl. No.: 764,079

[22] Filed: Aug. 9, 1985

[30] Foreign Application Priority Data

Aug. 10, 1984 [DE] Fed. Rep. of Germany ....... 3429438

[51] Int. Cl.$^4$ ............................................. C09K 19/00
[52] U.S. Cl. ............................................. 428/1; 428/4
[58] Field of Search .......................................... 428/1

[56] References Cited

U.S. PATENT DOCUMENTS 4,402,999  9/1983  Tatsumichi et al. ................. 428/1
4,490,015  12/1984  Kawarada et al. ................... 428/1

FOREIGN PATENT DOCUMENTS 0084729  8/1983  European Pat. Off. .
1338764  11/1973  United Kingdom .

OTHER PUBLICATIONS

"Optical Storage Media", A. E. Bell, A. A. Jamberdino, Editors, Proc. SPIE 420, 194–199 (1983).

Primary Examiner—Marion C. McCamish
Attorney, Agent, or Firm—Keil & Weinkauf

[57] ABSTRACT

An optical recording medium contains, on a base, one or more dyes and a polymer which forms liquid-crystalline phases.

The information is written into the uniformly oriented liquid-crystalline polymer layer, for example by means of a laser. During this procedure, the polymer heats up locally to above a phase transition temperature. By cooling, the resulting change is frozen in the glass state.

The information can be erased by applying an electric field and/or heating.

The recording material permits high-contrast storage and possesses high sensitivity, good resolution and excellent stability.

5 Claims, 1 Drawing Figure

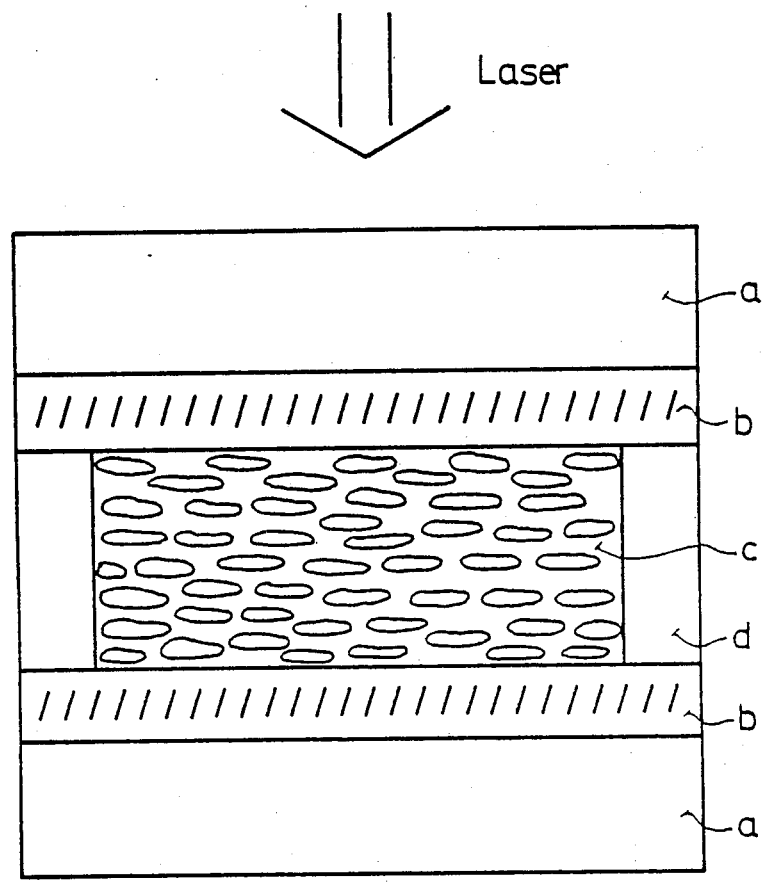

OPTICAL RECORDING MEDIUM

The present invention relates to an optical recording medium in which a liquid-crystalline, dye-containing polymer layer is supported on a base.

Optical data stores are known. The reflectance behavior of a medium consisting of glass or a suitable plastic and coated with a photosensitive material is modified from point to point by means of light of a certain wavelength, preferably by laser beams or other suitable high-energy beams. During the read operation, areas which have been written on and those which have not been written on are recognized, and the original signal is reconstructed from this information. An overview of the existing systems is given by, for example, H. Brody in Laser Focus August 1981, page 47 et seq., where further references are also to be found.

The use of dyes for light absorption in optical stores is known. U.S. Pat. No. 4,097,895 describes, for example, a recording medium which consists of a disk-like base of glass and a light-reflecting aluminum layer which is covered with a layer of a dye. A laser beam detaches the absorbing dye layer and vaporizes or melts it, and thus bares the light-reflecting layer. The information recorded in this manner can be read again by means of a laser.

U.S. Pat. No. 4,380,769 discloses a recording medium which contains, as the light-absorbing layer, azo dyes in a polymeric binder. In other known optical storage systems, the absorbing compounds used are oxazines (Japanese Preliminary Published Application No. 132 231/1983), cyanine dyes (Japanese Preliminary Published Application Nos. 112 790/1983 and 125 246/1983), phthalocyanine compounds EP-A No. 84 729, U.S. Pat. No. 4,241,355 and Japanese Preliminary Published Application No. 56 892/1983) and 1,4-naphthoquinone compounds (EP-A No. 97 929).

Erasable recording media which, for example, utilize the photochromatism of dyes for information storage are also known. German Laid-Open Application DOS No. 3,007,296 describes the use of an indigoid photochromic dye bonded to a polymer, while German Laid-Open Application DOS No. 3,220,257 describes photochromic spiro compounds as radiation-sensitive materials for optical stores.

Low molecular weight liquid-crystalline materials are used as light modulators in electro-optical displays, the optical behavior of the liquid-crystalline layer usually being modified by means of an applied electric field (cf. for example H. Kelker and R. Hatz, Handbook of Liquid Crystals, 1980, page 603 et seq. or B. Bahadur, Mol. Cryst. Liq. Cryst. 99 (1983), 345–374).

It is also known that thin liquid crystal layers can be driven using laser beams, this being described by, for example, F. J. Kahn in Appl. Phys. Lett. 22 (1973), 111 et seq., for the production of high-resolution graphic displays. The incident laser energy (1.06 $\mu$m) is absorbed by an $In_{2-x}Sn_xO_{3-y}$ electrode. As demonstrated by H. Birecki, S. Naberhuis and F. J. Kahn in Optical Storage Media, Alan E. Bell and Albert A. Jamberdino, Editors, Proc. SPIE 420, 194–199 (1983), the same principle can also be applied to the production of an erasable optical store.

T. Urabe, K. Arai and A. Ohkoshi (J. Appl. Phys. 54 (3) (1983), 1552–1558) use dichroic dyes to absorb the incident energy (helium-neon laser) in smectic liquid crystals.

German Laid-Open Application DOS No. 2,618,023 describes a liquid crystal cell which can be addressed using a gallium arsenide laser and in which the laser energy is absorbed by a dye-containing layer.

As shown in German Laid-Open Application DOS No. 3,337,316, a liquid crystal cell can also be driven by means of an electron beam.

Polymers which form liquid crystalline phases and carry mesogenic groups in the main chain or side chain are known, a survey of this class of compounds being given in, for example, Polymer Liquid Crystals, A. Ciferri, W. R. Krigbaum and R. B. Meyer, Academic Press New York, 1982.

The use of polymers forming liquid-crystalline phases for self-reinforcing plastics is reported by, for example, J. H. Wendorff in Kunststoffe 73 (1983) 9, 524–528.

In principle, liquid-crystalline polymers show the same behavior as low molecular weight liquid crystals and, for example, can be oriented in an electric field (H. Ringsdorf and R. Zentel, Makromol. Chem. 183 (1982), 1245–1256, and H. Pranoto and W. Haase, Mol. Cryst. Liq. Cryst. 98 (1983), 299–308). Driving a liquid-crystalline polyacrylate by thermal means was first achieved by V. P. Shibaev et al., Polym. Commun. 25 (1983), 364–365.

It is an object of the present invention to provide an optical recording medium which stores the written information stably over a long period and, if required, can be erased locally or over the whole surface. Moreover, the recording medium should be capable of being written on, read and, if required, erased by means of a laser.

We have found that a very suitable optical recording medium consisting of a base and a dye-containing polymer layer is obtained if the polymer layer, which contains one or more dyes, is a polymer which forms liquid-crystalline phases.

The polymer layer can be located between two glass or plastic supports, each of which can be provided on the inside with a transparent electrode. Suitable transparent electrically conductive layers are the conventional indium oxide layers, for example those doped with tin (ITO). It is also possible to use one transparent and one reflecting electrode. Examples of suitable light-reflecting materials are aluminum, rhodium, gold and copper.

To achieve a uniform texture of the liquid-crystalline polymer, the surface of the electrodes may have to be treated. Methods for producing a uniform, homogeneously or homeotropically oriented liquid crystal layer are described in, for example, H. Kelker and R. Hatz, Handbook of Liquid Crystals, 511 et seq. (1980).

The information is written, for example, with a laser into a uniformly oriented liquid-crystalline polymer layer. During this procedure, the polymer heats up, for example locally, to above a phase transition temperature (eg. smectic→nematic) or to above the clear point (eg. nematic→isotropic). On cooling, the area written on exhibits a change in the light scattering, optical activity, birefringence or absorption, and this change can be stably frozen in the glass state of the polymer. The information written in can, if required, be erased again by applying an electric field and/or simultaneously heating locally or over the whole surface.

The novel recording material permits high-contrast storage of the written information. It possesses high sensitivity, good resolution and, since the polymer layer cannot crystallize, excellent long-term stability.

Suitable liquid-crystalline polymers are described in, for example, German Laid-Open Applications DOS No. 2,722,589, Dos. No. 3,211,400 and DOS No. 3,334,056 (p 3334056.0) and EP-A No. 7 574.

Preferred polymers and copolymers are those whose chains are composed of units of the formula

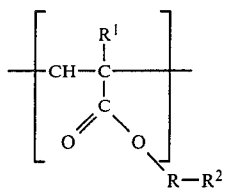

(I)

of which contain units of the formula (I) in the chain. In formula (I), $R^1$ is hydrogen or methyl, R is —$(CH_2)_n$— or —$[CH_2—CH_2—O—]_m—CH_2—CH_2—$, where n is 2–25 and m is 0–2, $R^2$ is

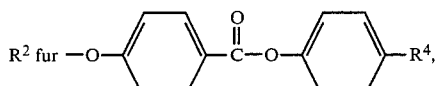

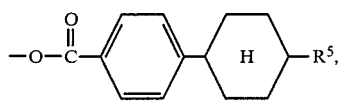

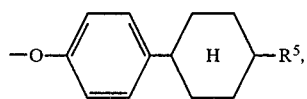

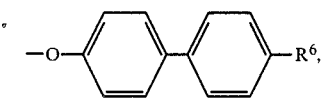

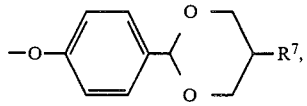

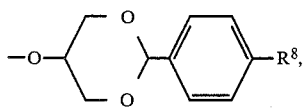

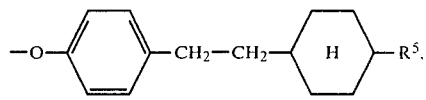

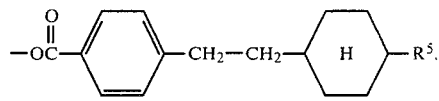

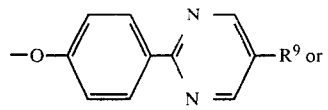

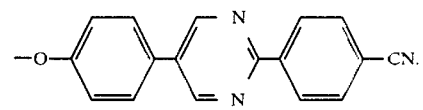

the radicals R and $R^2$ being identical or different in each case, $R^4$ is cyano, chlorine, bromine, nitro, alkyl or alkoxy or is phenyl which is substituted in the 4-position by cyano, chlorine, alkyl or alkoxy, $R^5$ is alkyl, $R^6$ is cyano, 4-cyanophenyl or alkoxy, $R^7$ is alkyl or alkoxy, $R^8$ is cyano, alkyl, alkoxy, cyclohexyl, 4-alkylcyclohexyl, 4-cyanophenyl, 4-alkylphenyl or 4-alkoxyphenyl and $R^9$ is cyano, alkyl, alkoxy, 4-cyanophenyl or 4-alkoxyphenyl, the alkyl and alkoxy groups being of 1 to 25 carbon atoms.

The above liquid-crystalline polymers, which are homopolymers or copolymers form nematic or smectic phases or nematic and smectic phases. It is also possible to induce cholesteric phases, as described in EP-A No. 7574.

The dyes which are required for driving by means of a laser, and which may or may not be pleochroic, are dissolved in the polymers or copolymers described above. The light absorption of the dyes should be matched with the wavelength of the laser used. Where the write and read operations are to be carried out using different lasers, it is advantageous to employ a mixture of dyes which possess a high absorption in the wavelength ranges of the lasers used.

Suitable dyes are disclosed in, for example, German Laid-Open Applications DOS. No. 3,148,206, DOS No. 2,618,023, DOS No. 2,058,252, DOS No. 3,342,040, DOS No. 3,342,578, DOS No. 3,324,420 and DOS No. 3,406,209, U.S. Pat. Nos. 3,291,746 and 4,335,959, EP-A No. 56 492 and Angew. Chem. 80 (1968), 541. Specific examples are:

(1) Azo dyes

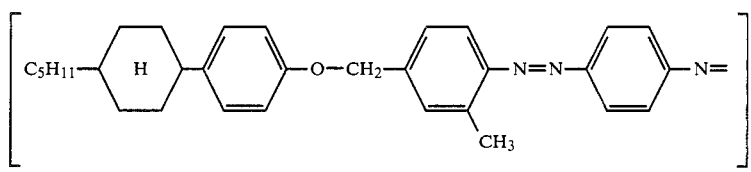

$\lambda_{max}$ (CH$_2$Cl$_2$): 417 nm

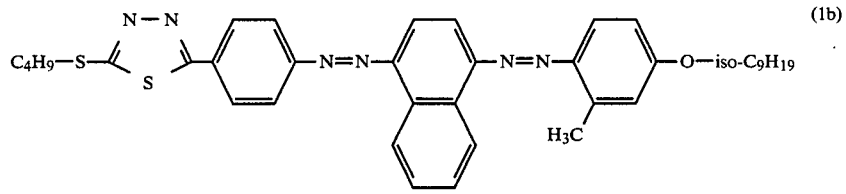
λ$_{max}$ (CH$_2$Cl$_2$): 454 nm
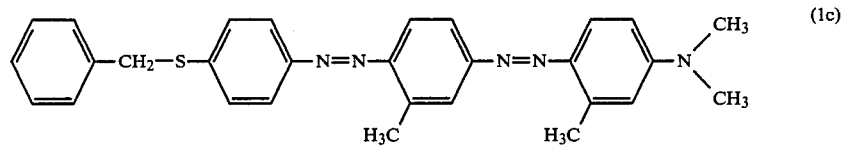
λ$_{max}$ (CH$_2$Cl$_2$): 480 nm
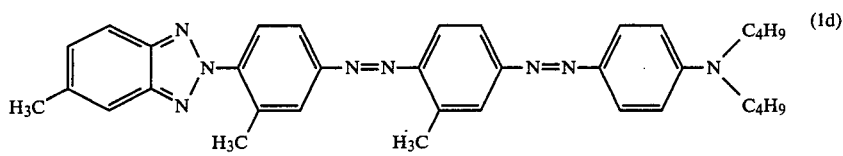
λ$_{max}$ (CH$_2$Cl$_2$): 508 nm
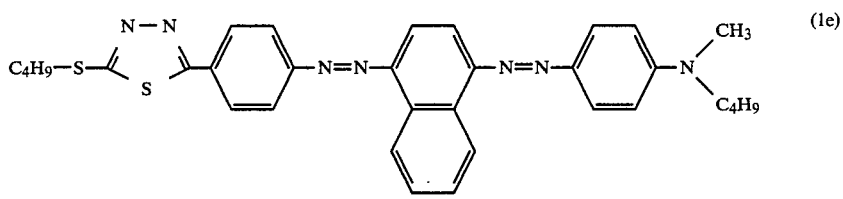
λ$_{max}$ (CH$_2$Cl$_2$): 543 nm
(2) Perylene derivatives
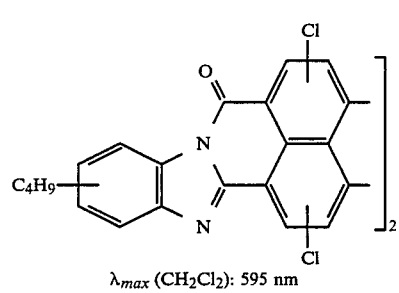
λ$_{max}$ (CH$_2$Cl$_2$): 595 nm
(3) Anthraquinone dyes
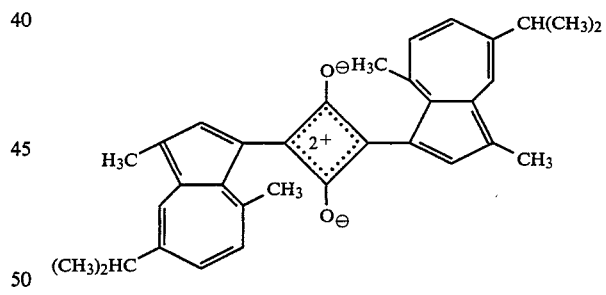
(5) Phthalocyanines
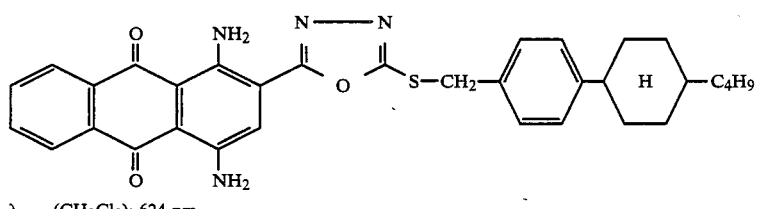
λ$_{max}$ (CH$_2$Cl$_2$): 624 nm
(4) Cyanine dyes

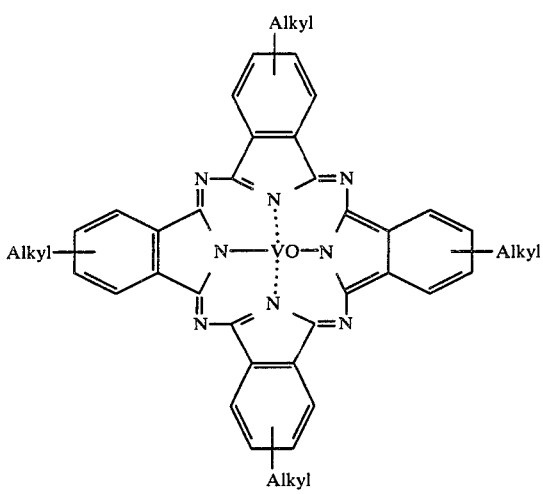

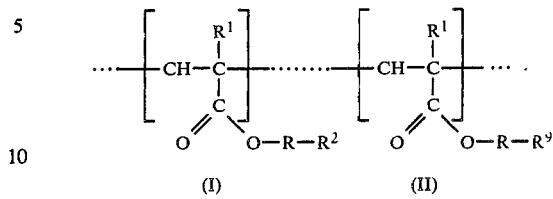

Furthermore, copolymers (III) whose chains are composed of units of the formulae (I) and (II)

or which contain these units in the polymer chain are preferred for the recording media according to the invention. In the formulae, R, $R^1$ and $R^2$ have the above meanings and $R^9$ is a dye which is bonded to R via —O—, —S— or —N and whose light absorption is matched with the wavelengths of the laser used.

The liquid-crystalline copolymers (III) described form nematic or smectic phases, nematic and smectic phases or, as described in EP-A No. 7574, cholesteric phases.

Examples of dye radicals $R^9$ are:

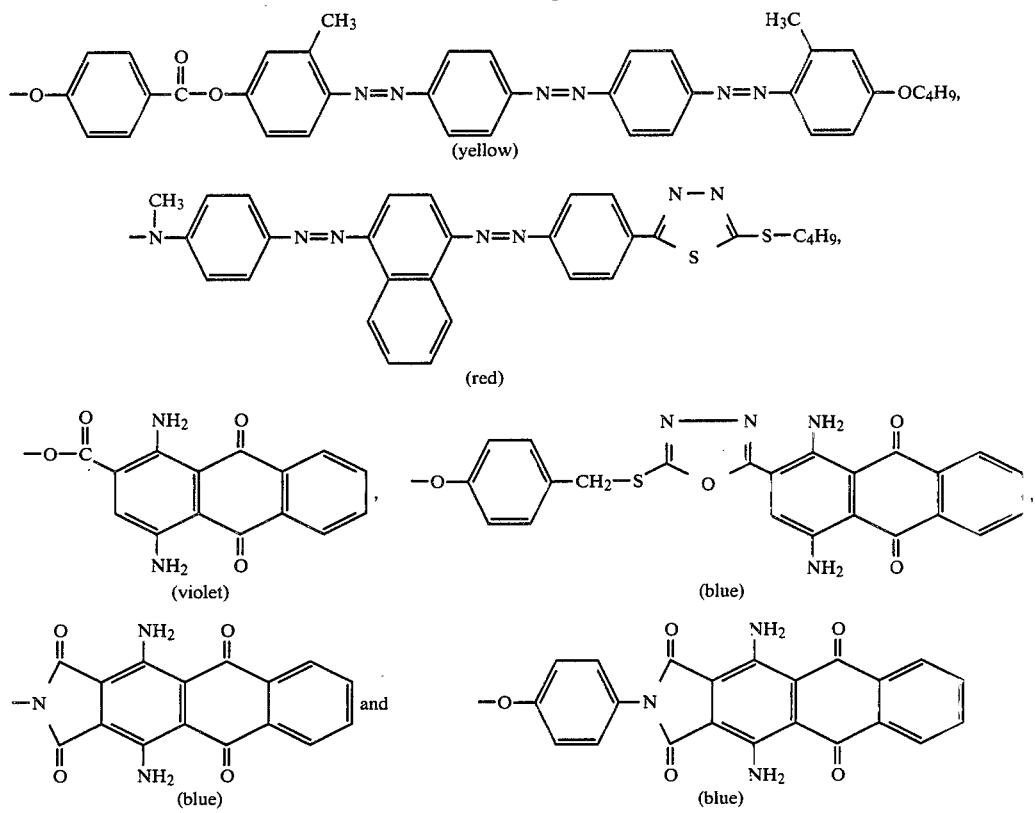

(6) Metal complexes

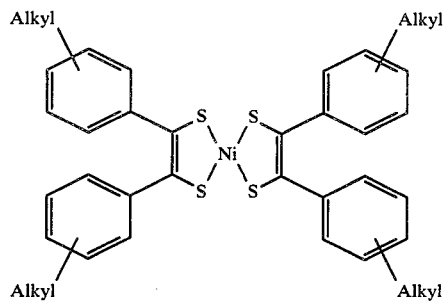

Particularly preferred copolymers are those whose polymer chain is composed of units of the formulae (Ia) and (IIa) (=polymer IV) or of units of the formulae (Ia) and (IIb) (=polymer V). The synthesis and analysis of the copolymers are described in German Laid-Open Application DOS No. 3,211,400.

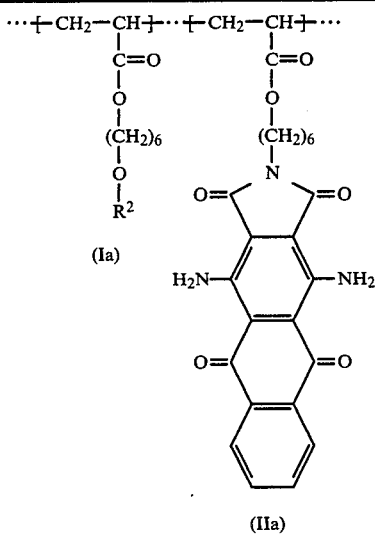
(Ia)
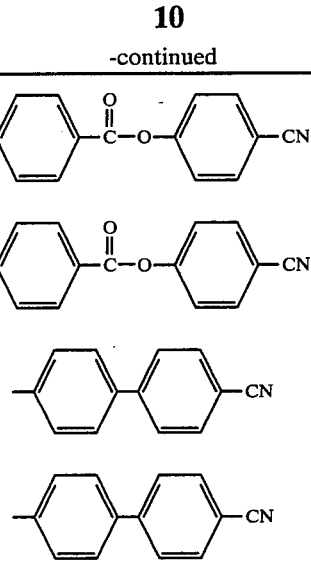
(IIa)
| Polymer | R² | Dye content, % by weight |
|---|---|---|
| IV. (1) |  | 2 |
| IV. (2) | | 15 |
| IV. (3) | | 30 |
| IV. (4) | | 2 |
| IV. (5) | | 12 |
| IV. (6) | | 36 |
| IV. (7) | | 2 |
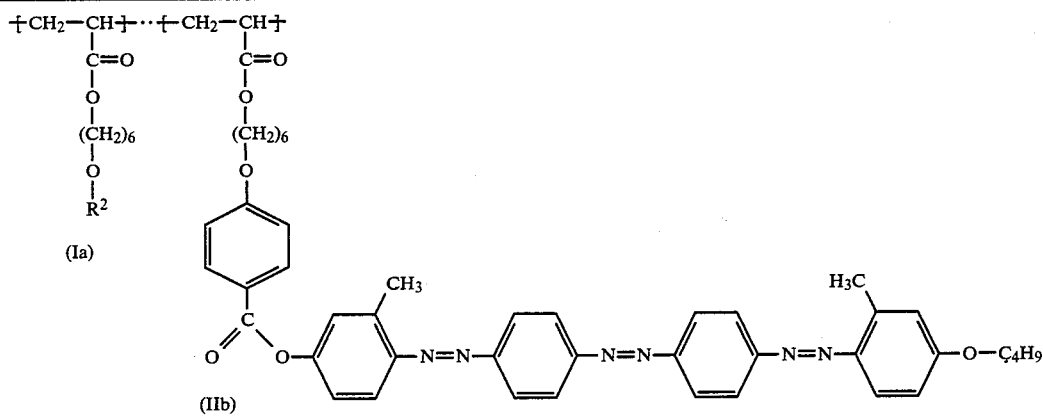
(IIb)
| Polymer | R² | Dye content, % by weight |
|---|---|---|
| V. (1) | | 2 |
| V. (2) | | 2 |
| V. (3) | | 2 |
Table 1 summarizes the phase transitions of polymers (IV.1) to (IV.7) and (V.1) to (V.3) and the degree of order S for polymers (IV.1), (IV.4), (IV.7) and (V.1) to (V.3), the said phase transitions having been determined by means of differential thermal analysis and polarization microscopy. The degree of order was determined on homogeneously oriented samples (layer thickness: 10 um, edge orientation: polyimide) at room temperature.

The degree of order S was calculated using the known equation $$S = \frac{CR - 1}{CR + 2}$$

The dichroic ratio CR was determined by measuring the extinctions E'' (measurement with light polarized parallel to the preferred direction of the nematic phase) and E$^-$ (measurement with light polarized perpendicular to the preferred direction of the nematic phase) and using the relationship $$CR = \frac{E''}{E^-}$$

TABLE 1

| Polymer | Phase transitions (g: glassy, n: nematic, s: smectic, i: isotropic) | Degree of order |
| --- | --- | --- |
| IV. (1) | g 29 n 130 i | 0.67 (at 682 nm) |
| IV. (2) | g 34 n 111 i | |
| IV. (3) | g 50 n 91 i | |
| IV. (4) | g 35 n 132 i | 0.69 (at 682 nm) |
| IV. (5) | g 42 n 115 i | |
| IV. (6) | g 55 n 89 i | |
| IV. (7) | g 29 S$_A$ 95 n 119 i | 0.79 (at 673 nm) |
| V. (1) | g 28 n 124 i | 0.70 (at 450 nm) |
|  |  | 0.72 (at 500 nm) |
|  |  | 0.69 (at 550 nm) |
| V. (2) | g 30 n 117 i | 0.68 (at 450 nm) |
|  |  | 0.72 (at 500 nm) |
|  |  | 0.70 (at 550 nm) |
| V. (3) | g 26 S$_A$ 92 n 121 i | 0.78 (at 450 nm) |
|  |  | 0.84 (at 500 nm) |
|  |  | 0.81 (at 550 nm) |

Discotic polymers or copolymers whose polymer chain contains units of the formula

(VI)

are also preferred. In the formula, $R^{10}$ is $-(CH_2)_n$, where n is 4-24, and $R^{11}$ is a radical of the formula

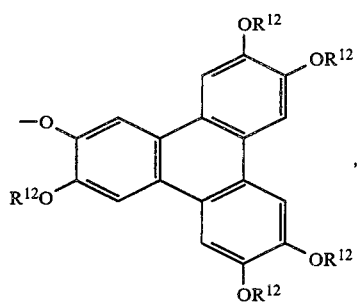

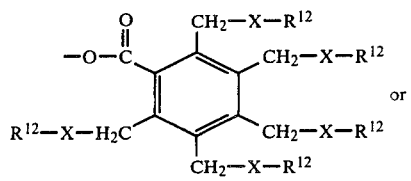

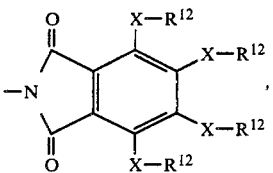

where X is —O—, —S—,

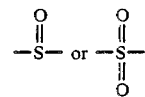  or  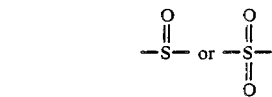

and $R^{12}$ is $C_1$-$C_{12}$-alkyl and the polymer may contain identical or different radicals $R^{11}$.

The dyes required for laser operation of the (VI)-containing polymers are dissolved in the polymer or copolymer and are selected to match the wavelength of the laser used.

Dyes suitable for this purpose have been disclosed, for example in German Laid-Open Application DOS No. 3,148,206 and J. Amer. Chem. Soc. 104 (1982), 5245.

Specific examples are

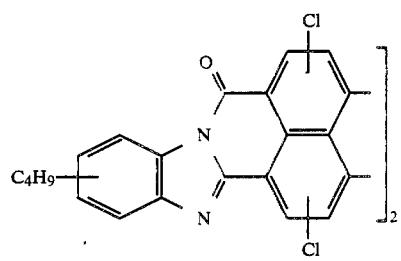

and

-continued

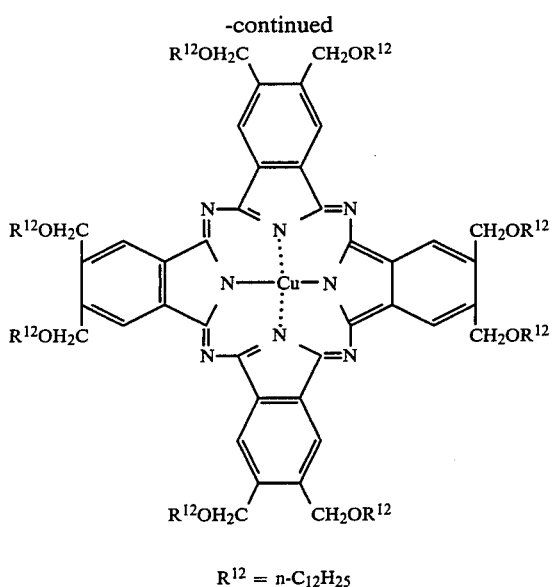

$R^{12}$ = n-$C_{12}H_{25}$

Furthermore, colored discotic polymers or copolymers whose polymer chain is composed of units of the formula

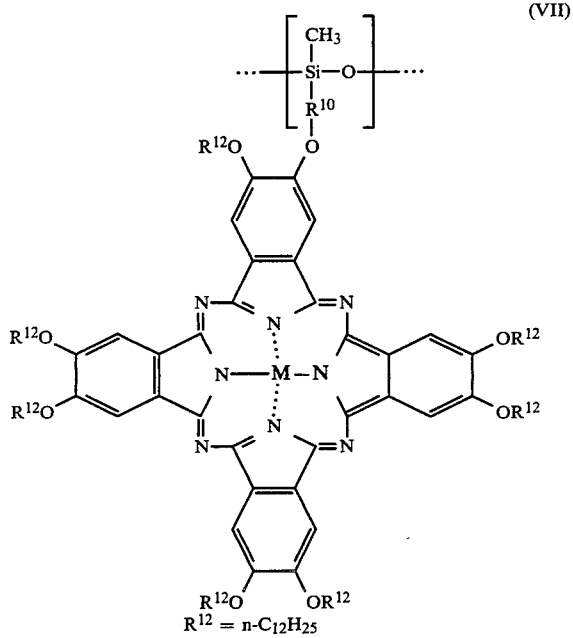

$R^{12}$ = n-$C_{12}H_{25}$ or contains units of the formula VII are particularly useful for the novel optical recording media. In formula (VII), $R^{10}$ and $R^{12}$ have the above meanings and M represents two hydrogen atoms or is a metal ion, eg. Cu(II).

The structure of the recording media is known, or known per se, and is described in detail in the Examples below.

Laser operation of the recording medium and reading of the stored information are carried out in a conventional manner, cf, for example H. Birecki, S. Naberhuis and F. J. Kahn in Optical Storage Media, Proc. SPIE 420 (1983), 194–199.

I. Structure of the recording medium

The FIGURE is a sectional side view of an embodiment of the invention. The dye-containing liquid-crystalline polymer (c) is located between two glass or PMMA supports (a), and the lower support may or may not possess a reflecting layer (eg. aluminum). A homogeneous planar texture of the polymer is achieved by means of either a silica layer deposited by the shadowing technique or a rubbed polyimide layer (b). A homeotropic texture of the polymer is achieved by means of a silane coating (b) on the support (a).

The orientation can be made even more uniform by heating in a magnetic field or in an electric field. The layer thickness is fixed by a spacer (d) which consists of, for example, Mylar film or glass fibers.

II. Examples

EXAMPLE 1

The recording medium had the structure described under I. The polymer layer (c) was 8 μm thick, the polymer used was polymer IV. 7, and the supports were provided on the inside with a polyimide layer. The polymer (c) was provided with a homogeneous planar orientation by heating for several hours at from 116° to 117° C. (ie. a little below the clear point).

The medium was written on at room temperature with an He-Ne laser (focus: 5 μm; power 4 mW).

The written information could be found and rendered visible under the microscope with crossed polar filters. It was possible to erase the recording by heating at from 116° to 117° C.

EXAMPLE 2

The recording medium had the structure described under I. The polymer layer (c) was 3 μm thick, polymer IV.4 was used, and the supports (a) had a silica layer, deposited by shadowing, on the inside. The polymer layer (c) was provided with a homogeneous planar orientation by heating for several hours at from 126° to 127° C.

The medium was written on with an Ne-He laser, as described in Example 1 (focus: 3 μm; power: 4 mW).

It was possible to erase the recording by heating at from 126° to 127° C.

EXAMPLE 3

The recording medium had the structure described under I. The supports (a) were provided on the insides with a silane coating. Polymer IV.7 was used.

A homeotropic texture of the liquid-crystalline polymer was obtained by heating at from 116° to 117° C.

It was possible to write on the medium with an He-Ne laser, and the recording could be erased by heating at 117° C.

EXAMPLE 4

The recording medium had the structure described in Example 3 and was driven in the manner described in that Example, but the polymer used was polymer IV.2. Supports (a) provided with a transparent conductive coating were employed. It was possible to achieve the initial homeotropic texture by application of an electric field and by means of an additional silane coating. The written information could be erased again by heating and simultaneously applying an electric field. The erase operation took place more rapidly than in the case of the medium of Example 3.

EXAMPLE 5

The recording medium had the structure described in Example 4 and was driven in the manner described in that Example. However, the upper support had a transparent conductive coating (ITO) and the lower one had a reflecting conductive coating, eg. aluminum.

EXAMPLE 6

The recording medium had the structure described in Example 4 or 5 and was driven in the manner described in these Examples. However, a homogeneous orientation of the polymer IV.2 was achieved by means of a silica layer deposited by shadowing, and a virtually homeotropic initial texture was obtained by applying an electric field.

EXAMPLE 7

The recording medium had the same structure as that described in Example 2. In addition, the supports possessed a transparent conductive coating on the insides. Copolymer IV.4 was used as (c), and the information was written with the laser in the presence of an applied electric field of 10 V/50 Hz. The laser brought the liquid-crystalline polymer into a switchable state locally, and the applied electric field reoriented the polymer in the written areas. In this embodiment, the resulting change in absorption of the layer in the area written on was read.

It was possible to erase the information again by heating.

A similar result was obtained when the upper support had a transparent electrically conductive coating, and the lower support possessed a reflecting conductive coating.

EXAMPLE 8

The recording medium had the same structure as that described in Example 4. The polymer used was polymer IV.7. The homeotropic initial texture was achieved by means of a silane coating on the supports (a).

During writing of the information with an He-Ne laser, an electric field was applied simultaneously (10 V/50 Hz). As in Example 7, the change in absorption of the layer in the area written on was read.

We claim:

1. An optical recording medium which possesses, on a base or between two supports, a layer comprising a polymer which forms liquid-crystalline phases and contains one or more dyes wherein the dye is chemically bonded, via a spacer, to the polymer.

2. An optical recording medium as claimed in claim 1, wherein the polymer contains a pleochroic dye.

3. An optical recording medium as claimed in claim 1, wherein the polymer forming liquid-crystalline phases forms a nematic phase.

4. An optical recording medium as claimed in claim 1, wherein the polymer forming liquid-crystalline phases forms a nematic phase and a smectic phase.

5. An optical recording medium as claimed in claim 1, wherein the polymer forming liquid-crystalline phases forms a cholesteric phase.

* * * * *